Oct. 30, 1928.
G. A. RICHTER
1,689,534
CYCLIC PROCESS FOR THE MANUFACTURE OF KRAFT PULP
Filed Dec. 4, 1925
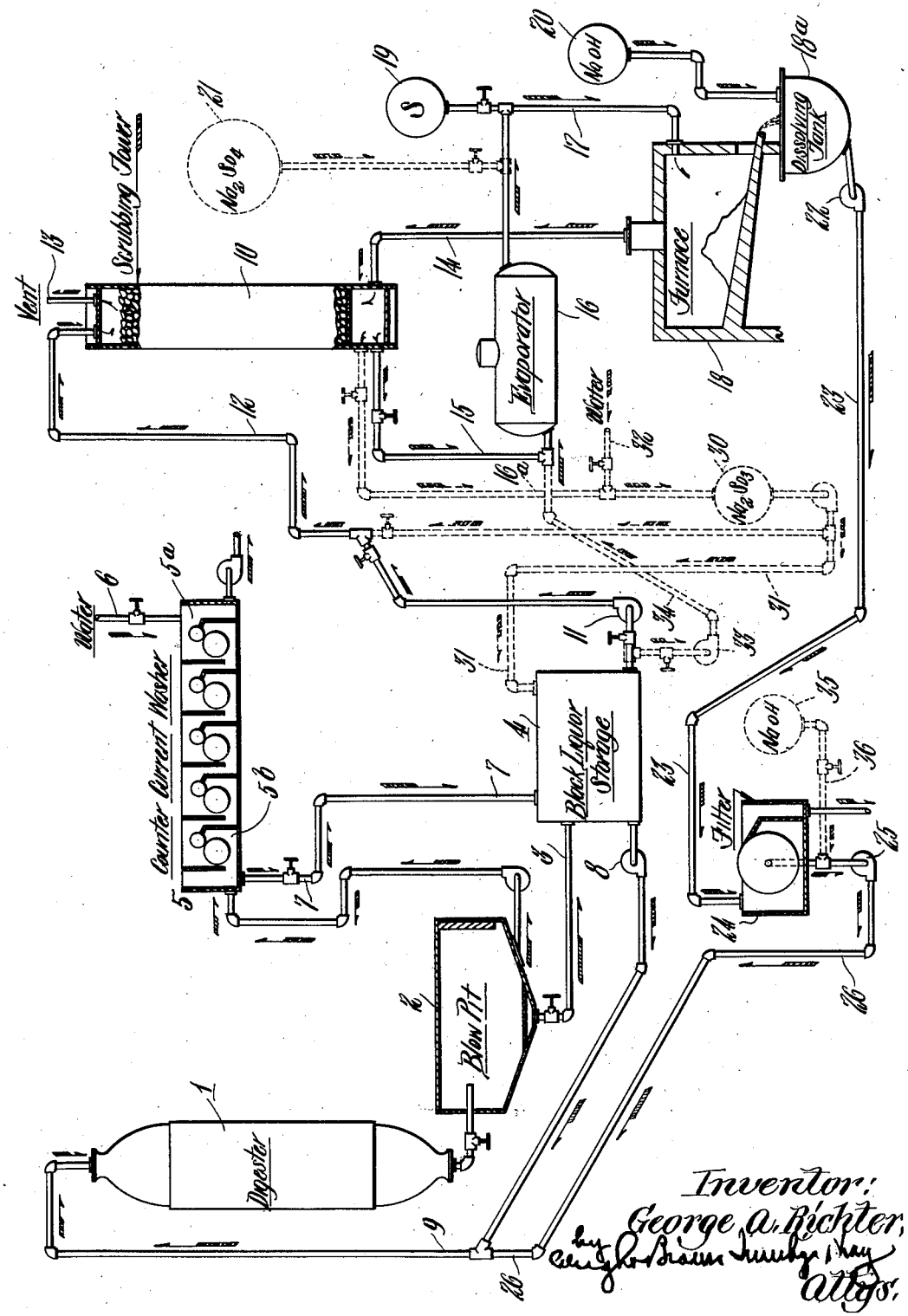
Inventor:
George A. Richter, Patented Oct. 30, 1928.

1,689,534

UNITED STATES PATENT OFFICE.

GEORGE A. RICHTER, OF BERLIN, NEW HAMPSHIRE, ASSIGNOR TO BROWN COMPANY, OF BERLIN, NEW HAMPSHIRE, A CORPORATION OF MAINE.

CYCLIC PROCESS FOR THE MANUFACTURE OF KRAFT PULP.

Application filed December 4, 1925. Serial No. 73,194.

This invention relates to the kraft or sulphate process of fiber liberation so-called, wherein wood chips are digested in a liquor consisting essentially of sodium hydroxide, sodium sulphide and small amounts of adventitious sodium carbonate and sodium sulphate, to yield a pulp which is characterized especially by its great strength and which on that account is employed extensively in the manufacture of strong papers.

The raw material used in making up losses occurring in the digesting and recovering cycle for the preparation of a fresh kraft digesting liquor is usually sodium sulphate (salt cake), which is introduced together with the evaporated and concentrated black spent liquor resulting from digestion into the recovery retort or furnace, wherein the organic or combustible content of the liquor is burned and the valuable inorganic or mineral content is smelted in a reducing atmosphere, to yield a smelt composed of sodium carbonate, sodium sulphide and small adventitious amounts of unreduced sodium sulphate. The hot effluent smelt from the furnace is dissolved in water to yield a hot smelt solution, which is then causticized while being agitated, with sufficient lime to convert its sodium carbonate content to caustic soda, whereupon the calcium carbonate precipitated in causticization is removed from the liquor by filtration. The filtered white liquor containing the recovered sodium compounds is utilized for the liberation of pulp from other wood chips. Thus far I have briefly outlined the kraft process as generally practised.

If the losses of the raw material (sodium sulphate) actually represented leakage or wastage of sodium sulphate or sodium sulphide as such, the effluent active or regenerated alkali compounds in the smelt from the recovery retort would contain practically no sodium carbonate. The usual kraft mill white digesting liquor, however, contains considerably more sodium hydroxide than sodium sulphide. This sodium hydroxide must necessarily result from the causticization of the sodium carbonate of the smelt liquor. The conclusion which may be drawn from this is that the formation of sodium carbonate in the smelting or recovery operation, or in other words, the higher ratio of sodium to sulphur in the cooking liquor than that existent in sodium sulphate results from the fact that more sulphur than sodium constituent is lost in the usual kraft process cycle.

The usual kraft process cycle, therefore, includes the conversion of the sodium carbonate contained in the smelt to caustic soda, as previously indicated, because sodium carbonate has very little value as a fiber liberating agent, i. e., as a solvent for effecting the removal of the encrusting or cementitious content of wood chips. Such sodium carbonate content in the smelt, as previously stated, is formed due to a loss of sulphur corresponding in chemical equivalents to the sodium carbonate present in the smelt liquor.

On the other hand, sodium sulphide, while not quite as active as sodium hydroxide in the liberation of fiber from wood chips, is an active pulping agent, and I have found that wood chips can be pulped successfully with a liquor containing essentially only sodium sulphide as the fiber-liberating agent to yield a pulp essentially equivalent to the usual commercial kraft pulp.

In various tests which I have conducted in connection with the present invention, I have found that in usual kraft mill practice, the gas arising from the smelting retort during the incineration of the organic content and the smelting of the inorganic content of the concentrated and evaporated spent black liquor, together with the salt cake introduced thereinto for making up losses under reducing conditions, consists of water vapor, carbon dioxide, sulphur dioxide, as well as of sublimed sodium compounds, viz, sodium carbonate, sodium sulphate, and sodium sulphide, which are present in such gas as a very fine mist or fog. The sodium compounds in such condition are frequently recovered as by means of a Cottrell precipitator, but the sulphur dioxide, together with the other tail gases, are vented or wasted into the atmosphere, constituting a nuisance to the surrounding community. Tests during plant operation indicate that the sulphur contained in such wasted gas may run as high as 45 to 60 pounds of sulphur per ton of kraft pulp produced.

In accordance with the present invention, however, provision is made to recover both the sodium and sulphur constituent present in the retort gas and to return these recovered chemicals into the recovery cycle. By so doing, the loss of the large amount of sulphur which accounts and is responsible for the presence of the large amount of sodium carbonate in the smelt liquor is prevented, and the usual malodors or nuisance attendant with the operation of a kraft plant is thereby in large measure eliminated. Thus, the smelt will consist preponderantly, in fact almost in entirety, of sodium sulphide, together with a relatively small percentage of sodium carbonate and a slight adventitious amount of unreduced sodium sulphate. A very important advantage is forthcoming from this method of procedure, in that the necessity for the usual causticization of the smelt with lime is eliminated. In certain cases, moreover, the filtration of the causticized smelt liquor may be omitted, such filtration, however, always being required in the usual kraft process for the separation of the precipitated calcium carbonate where causticization of the smelt liquor must be resorted to.

In the practice of the present invention the valuable sulphur and sodium constituent present in the retort gas are recovered by passing such gas through a scrubbing tower into contact with and in counter current flow to black spent liquor or other suitable aqueous absorbing medium. Both constituents are absorbed by the medium, and are then returned to the recovery cycle and are finally smelted, together with the evaporated and concentrated spent liquor. Where the absorbing medium or vehicle is black spent liquor, such liquor after passage through the scrubbing tower will be materially richer or stronger in sulphur and sulphur compounds, and after the evaporation or concentration of such black liquor to the desired degree Baumé and the burning of its organic content and the smelting of its inorganic mineral content under reducing conditions in a recovery retort, the smelt will contain materially more sodium sulphide than is present ordinarily.

With the foregoing and other objects and features in view, a more complete understanding of the present invention may be gained from the following more complete description thereof, when considered in conjunction with the accompanying diagrammatic and conventional drawing which may be termed a "flow" sheet, and which represents the flow or course of the various materials employed in the process.

Referring to the drawing, at 1, I have indicated a digester in which wood chips (spruce, for example) may be digested in a liquor produced in accordance with the present invention under the desired conditions until the liberation of pulp from the chips has been completed. The digester contents are then blown into the usual blow pit 2, wherein the pulp may be strained and separated from a portion of its spent liquor which is passed by the pipe 3 into the black liquor storage tank 4. The pulp, together with its associated black liquor, is delivered to a washer 5, wherein the pulp is washed and separated from the spent liquor prior to passage through the usual screens which are employed for refining the pulp and removing the so-called screenings, consisting of shives, knots, particles of brick, etc. The washer shown consists of a series of pulp washers substantially like those described and claimed in U. S. Patent No. 1,421,664, dated July 4, 1922, to Brown, Martinson et al., although if desired one may utilize the ordinary rotary vacuum type of washer. In the washer of the patent referred to the pulp is carried successively through tanks in one direction and the washing liquor is carried continuously through such tanks in the opposite direction. For this purpose the wash water is drawn from a water supply line 6 and is delivered to the last of the group of washers indicated at 5$^a$, from which the washed pulp is drawn off and delivered to the usual screens (not shown). The strong black spent liquor obtained from the first of the group of washers indicated at 5$^b$ is delivered by the pipe line 7 into the storage tank 4.

A portion of the black liquor in the tank 4 is withdrawn by a pump 8 and forced through a conduit 9 into the digester 1, wherein it is re-utilized, together with freshly prepared white liquor for the pulping of other chips. The remaining portion of the black liquor may now be employed in absorbing the valuable sulphur and sodium constituent present in the gases from the recovery retort and thereafter, after the evaporation of a portion of its aqueous content for the recovery of its inorganic content in the retort. For this purpose I have provided a scrubbing tower conventionally indicated as a whole at 10 and containing a mass of inert interstitial or surface material, such as spiral brick, field rock, or the like, so that the vapors and gases from the retort which are delivered thereinto at its lower portion from the retort flue 14 are broken up into multitudinous streamlets in passing upwardly through such material and thereby come into intimate contact over a large area of surface material and in counter-current flow to the black spent liquor delivered into the top of the tower from the tank 4 by a pump 11 through the pipe line 12. Preferably the flow of the black liquor is so regulated and controlled through the tower 10 that an equilibrium is established wherein there is practically no loss or only a negligible loss of sulphur constituent in the tail gas, which consists essentially of carbon dioxide and water vapor, and accumulates at the top of the tower, from which it may be vented or wasted into the atmosphere through an outlet pipe 13. In passing through the interstitial material in the tower, not only is the sulphur in the form of sulphur dioxide and the sublimed sodium compounds recovered, but incidentally a partial concentration or evaporation of the black liquor is effected by the hot retort gas, which approximates a temperature of about 450° F. Moreover, certain reactions ensue in the scrubbing tower between the sulphur dioxide and the sodium sulphide in the black liquor, as well as sublimed sodium compounds absorbed therein, resulting in the formation of sodium sulphite and sodium thiosulphate as reaction products,—such sulphur compound reaction products, however, being subsequently converted and recovered in the form of sodium sulphide under the reducing conditions maintained in the recovery retort.

The black liquor falling to the bottom of the tower 10 and forming a pool therein is withdrawn through an outlet pipe 15 and delivered to an evaporator 16, wherein a portion of its aqueous content is removed and a liquor of the proper degree Baumé is produced prior to conducting it by a pipe 17 into a recovery retort 18 for the combustion of its organic content and the smelting and recovery of its valuable inorganic content, as hereinbefore described. The effluent smelt from the furnace is caught and dissolved in water contained in a dissolving tank 18$^a$, producing a hot smelt liquor consisting essentially only of sodium sulphide.

In a mill favored by a cheap electrical supply so that caustic soda may be electrolytically produced economically, the "make-up" or replenishing chemicals necessary to replace mechanical losses, leakage, etc., of sodium constituents and sulphur may be introduced into the cycle by adding caustic soda from a storage tank 20 into the dissolving tank 18$^a$, and by the addition of sulphur as such into the furnace, or by adding it from a storage tank 19 to the evaporated and concentrated black spent liquor prior to its passage into the furnace. Thus in a kraft plant in connection with which the present invention was practised, the amount of caustic soda necessary for addition to the smelt liquor in the tank 18 necessary to replace losses of sodium constituent in the entire cycle produces a liquor of about 85% to 90% sulphidity, as compared with a sulphidity of only 35% before the application of the present invention, that is, without the recovery of the sulpur constituent in the retort gases. By the term "sulphidity" as herein employed, I mean the following ratio:

$$\frac{\text{Na}_2\text{O equivalent (in the form of sodium sulphide, Na}_2\text{S)}}{\text{Na}_2\text{O equivalent (in the form of sodium sulphide, Na}_2\text{S, and sodium hydroxide, NaOH)}}$$

The addition of sulphur and sodium constituent separately, respectively in the form of sulphur and caustic soda, allows the control or regulation of these constituents of the digesting liquor as desired, and also makes possible the assurance of the presence of a certain relatively small percentage of caustic soda, if desired, in the digesting liquor, which might prove to be a desirable feature when certain types of woods, which are somewhat resistant to the fiber-liberating action exerted by an essentially "all-sulphide" digesting liquor, are to be pulped.

In certain cases, however, where local or plant conditions are other than those hereinbefore outlined, the addition of caustic soda may be omitted and a modified method of procedure for simultaneously making up the losses of both sulphur and sodium constituent may be followed by introducing sodium sulphate (salt cake) into the recovery furnace by adding such salt cake from a storage tank 21 (indicated in dotted outline) to the evaporated and concentrated black liquor in its passage into the furnace.

The smelt liquor may be passed directly from the tank 18$^a$ to the digester 1 or it may be filtered prior to its introduction into the digester, depending on the degree of cleanliness of the kraft fiber which it is desired to produce, and is employed together with the recirculated portion of the black spent liquor from the tank 4, for the liberation of fiber from wood chips. Where a clean kraft fiber is desired, such smelt liquor must be freed or separated from mechanical or solid impurities and accordingly in the drawing I have shown a pump 22 which withdraws the smelt liquor from the dissolving tank 18 and conducts it by a pipe line 23 to a filter 24 (which may be of the usual rotary type, if desired, as shown), wherein the liquor is freed from solid impurities entrained therein. The filtered white liquor is withdrawn from the filter 24 by a pump 25 and forced through a conduit 26 communicating with the pipe line 9 into the digester. Where filtration of the smelt liquor contained in the dissolving tank 18$^a$ is necessary prior to its use as a digesting liquor, it may be of advantage (where caustic soda is being added to such smelt liquor as a make-up material for lost sodium constituent) to add such caustic soda at a point beyond the filter, that is after filtration, thus eliminating the necessity for filtering the make-up caustic soda liquor. Accordingly, I have shown in dotted outline a storage tank 35, with which the pump 25 communicates by means of a valved pipe 36 through which caustic soda may be delivered into the filtered white liquor in regulated and controlled amount sufficient to replace sodium losses occurring in the entire cycle.

The cycle described incidentally affords a method of extending or using to greater advantage the principle of introducing sulphur into the recovery retort of a kraft plant by adding it to the evaporated and concentrated spent black liquor prior to the combustion and smelting operation as disclosed and claimed in U. S. Letters Patent No. 1,469,960, dated October 9, 1923, to Douglas H. McMurtrie and myself. In this connection it is to be stated that as the amount of free sulphur present during the smelting operation is increased, the sulphidity of the effluent smelt from the retort is increased, but entails the disadvantage of an increased loss of sulphur as sulphur dioxide in the retort gases, so that in carrying out the introduction of free sulphur into the recovery retort as disclosed in the patent referred to it is uneconomical to introduce such sulphur beyond a certain point of sulphidity in the smelt. In the practice of the present invention, however, the sulphidity of the smelt may, if desired, be increased to a maximum, inasmuch as the sulphur constituent content in the retort gas is recovered and returned to the cycle. As a matter of practice, after equilibrium has been established in the cycle, only that amount of sulphur which corresponds to leakage or losses of liquor at various points in the plant would be added.

Another salient feature flowing from the practice of the hereinbefore described process is that I am enabled to dispense with the use of the lime, and the equipment, labor and plant space incident to the usual causticization of the spent liquor, thus effecting a material saving in the production of kraft pulp.

In certain instances it may, however, be of advantage to follow a somewhat modified procedure of recovering sodium carbonate and sulphur dioxide from the retort gases, such procedure embodying the circulation through the scrubbing tower 10 of an absorbing aqueous medium other than the black spent liquor derived from the alkaline or kraft digestion. Such a procedure may be preferable, particularly if trouble is experienced due to the precipitation of organic or resinous matter from the black liquor within the scrubbing tower, such precipitation tending to plug up the interstices in the interstitial material, and thus impairing the flow of gas and liquor therethrough. Certain black liquors resulting from the digestion of certain resinous woods, such as pine, will precipitate such gummy organic material when brought in contact within the scrubbing tower with the sulphur dioxide present in the retort gas. These gummy or resinous materials may be soaps or other complex organic substances precipitated from the black liquor or formed as reaction products because of the acidic condition produced by the presence of sulphur dioxide in the tower. If difficulty of this sort is encountered, it may be of advantage to somewhat modify the recovery system, as indicated by the dotted lines. This modification consists in circulating liquor from a storage tank 30 through the pipe 12 to the top of the scrubbing tower, from the bottom of which it is withdrawn through the pipe 16ª to the storage tank 30 and re-circulated until the desired concentration of sodium-sulphur compounds formed by the reaction of the sublimed sodium compounds and sulphur dioxide in the tower is produced therein, whereupon it is discharged through a pipe 31 into the black liquor storage tank 4. The liquor in the tank 30 may initially consist of fresh water introduced thereinto at seasonable temperature from a pipe line 32, communicating with the pipe 16ª. The black liquor may be bled off continuously from the black liquor storage tank 4 by means of a pump 33 and introduced directly by conducting it through the pipe line 34 into the evaporator 16 for the removal of a portion of its aqueous content. Such a recovery does not involve the use of black liquor and eliminates any trouble which might otherwise be encountered in the scrubbing tower. Of course, a slightly higher evaporation cost results, due to the additional liquor introduced into the black liquor storage tank from the tank 30, but such cost is relatively small.

Moreover, under certain conditions there might be a tendency for the sulphur dioxide in the retort gases to react with the sodium sulphide within the tower resulting in the liberation of hydrogen sulphide, which in turn might react with other sulphur dioxide to precipitate sulphur within the tower. Normally, however, the sulphur thus formed should be dissolved or absorbed in the liquor circulated through the tower to form sodium thiosulphate.

To diminish the tendency of such sulphur precipitation, as well as to prevent the loss of sulphur dioxide in the tail gases, particularly when the sulphur content of the concentrated black liquor undergoing the smelting and incinerating operation is especially high and consequently results in the production of retort gases of high sulphur dioxide content, and under conditions where the aqueous liquor or water circulated through the tower, and the retort gases contain less sodium constituent than is theoretically necessary to combine with all the sulphur dioxide, the make-up sodium constituent either in the form of caustic soda or soda ash is preferably introduced into the tower together with the desired amount of water, instead of being added beyond the filter tank or to the dissolving tank in the form of caustic soda, as shown in the drawing. Or, if advantageous, such make-up sodium constituent may be introduced into the tower under the conditions when black liquor is circulated through the tower. Of course, it is to be understood that a tower may be constructed of adequate size and the required amount of aqueous liquor at the proper temperature for absorbing all the sulphur dioxide contained in the retort gases may be circulated through said tower, thereby resulting in the production of an acid liquor; but operation with an alkaline effluent and circulating or absorbing liquor is preferable.

If desired, the recovery of the sodium and sulphur constituents in the retort gas may be divided into two stages. For instance, the sublimed sodium carbonate may first be recovered by suitable means, such as a Cottrell precipitator, and the remaining gases then delivered to a scrubbing tower, wherein the sulphur dioxide gas may be recovered as hereinbefore described.

Before concluding, it may again be stated that the drawings are wholly diagrammatic and conventional, no attempt having been made to show the true size relationship between the various instrumentalities or their location with reference to one another. For the sake of clarity in the drawings, details of construction have been omitted, but it will be understood that fittings, valves, pumps, or any other devices necessary for maintaining flow through the system will be supplied where necessary.

Having thus described this invention and certain preferred procedures in practising the same, it should be obvious that various changes might be resorted to without departing from its spirit or scope as defined by the appended claims.

What I claim is:

1. A process of fiber liberation, which comprises digesting raw cellulosic material in a liquor containing sodium sulphide, separating the pulp from the resulting spent liquor, concentrating and evaporating said spent liquor and smelting the inorganic content thereof, recovering said inorganic content in an aqueous solution for the digestion of other like raw cellulosic material, and recovering substantially all the sodium and sulphur constituents present in the form of sublimed solids and sulphur dioxide in the products of combustion from such smelting operation in an alkaline aqueous liquor.

2. A cyclic process of fiber liberation, which comprises digesting raw cellolosic material in a liquor containing sodium sulphide, separating the pulp from the resulting spent liquor, concentrating and evaporating said spent liquor and smelting the inorganic content thereof, recovering said inorganic content in an aqueous solution for the digestion of other like raw cellulosic material, recovering the sodium and sulphur constituents contained in the products of combustion from such smelting operation in an aqueous liquor, smelting the inorganic content of said liquor simultaneously with the smelting of the concentrated spent liquor, and recovering the smelt from both liquors.

3. A process which comprises concentrating and evaporating spent digesting liquor resulting from the digestion of raw cellulosic material in a liquor containing sodium sulphide, burning the combustible and smelting the inorganic content thereof, and passing the products of combustion from such smelting operation and an aqueous liquor into countercurrent contact with one another over a confined mass of inert interstitial material for the recovery of the sulphur and sodium constituents contained in such products of combustion, smelting the inorganic content of said liquor simultaneously with the smelting of the concentrated spent liquor, and recovering the smelt from both liquors in aqueous solution.

4. A process which comprises digesting raw cellulosic material in a liquor containing sodium sulphide, separating the pulp from the resulting spent liquor, concentrating and evaporating said spnt liquor, smelting the inorganic content thereof, passing the products of combustion arising in the smelting of such concentrated and evaporated spent liquor in counter-current contact with similar spent liquor through a mass of inert, interstitial material, for the recovery of the sodium and sulphur constituents contained in such products of combustion, smelting the inorganic content of said spent liquor simultaneously with the smelting of other spent liquor, and recovering the smelt.

5. A process which comprises digesting raw cellulosic material in a liquor containing sodium sulphide, separating the pulp from the resulting spent liquor, evaporating and concentrating the spent liquor, smelting the inorganic content of such concentrated and evaporated spent liquor, and recovering the sulphur and sodium constituents arising from such smelting operation in other like spent liquor prior to the concentration and smelting of its inorganic content.

6. A process which comprises digesting raw cellulosic material in a liquor containing sodium sulphide, separating the pulp from the resulting spent liquor, evaporating and concentrating such spent liquor, smelting the inorganic compounds contained in such concentrated and evaporated spent liquor, recovering the sodium and sulphur constituents in the products of combustion from such smelting operation in an alkaline aqueous solution, and smelting such recovered constituents together with said evaporated and concentrated spent liquor.

7. A process which comprises digesting raw cellulosic material in a liquor containing sodium sulphide, separating the pulp from the resulting spent liquor, evaporating and concentrating such spent liquor, smelting the inorganic compounds contained in such concentrated and evaporated spent liquor, recovering the sodium and sulphur constituents in the products of combustion from such smelting operation, smelting such recovered constituents together with said evaporated and concentrated spent liquor, and introducing free sulphur during such smelting operation to make up losses in sulphur constituent in said process.

8. A process which comprises digesting raw cellulosic material in a liquor containing sodium sulphide, separating the pulp from the resulting spent liquor, evaporating and concentrating such spent liquor, smelting the inorganic compounds contained in such concentrated and evaporated spent liquor, recovering the sodium and sulphur constituents in the products of combustion from such smelting operation, smelting such recovered constituents together with said evaporated and concentrated spent liquor, and introducing sulphur and sodium constituents during such smelting operation to make up losses of said constituents in the process.

9. A process which comprises digesting raw cellulosic material in a liquor containing sodium sulphide, separating the pulp from the resulting spent liquor, evaporating and concentrating such spent liquor, smelting the inorganic compounds contained in such concentrated and evaporated spent liquor, recovering the sodium and sulphur constituents in the products of combustion from such smelting operation, smelting such recovered constituents together with said evaporated and concentrated spent liquor, introducing free sulphur during such smelting operation to make up losses of sulphur constituent in said process, recovering the smelted inorganic compounds in aqueous solution, adding caustic soda to said aqueous smelt solution to make up losses of sodium constituent in said process, and utilizing said smelt liquor in the liberation of fiber from other raw cellulosic material.

10. A process which comprises digesting raw cellulosic material in a liquor containing sodium sulphide, separating the pulp from the resulting spent liquor, evaporating and concentrating such spent liquor, smelting the inorganic compounds contained in such concentrated and evaporated spent liquor, recovering the sodium and sulphur constituents in the products of combustion from such smelting operation, smelting such recovered constituents together with said evaporated and concentrated spent liquor, introducing free sulphur during such smelting operation to make up losses of sulphur constituent in said process, recovering the smelted inorganic compounds in aqueous solution, filtering said smelt solution, adding caustic soda to said smelt solution to make up losses of sodium constituent in said process, and utilizing such filtered liquor in the liberation of fiber from other raw cellulosic material.

11. A cyclic process which comprises digesting raw cellulosic material in a liquor containing sodium sulphide, separating the pulp from the resulting spent liquor, evaporating and concentrating such spent liquor, smelting the inorganic compounds contained in such a concentrated and evaporated spent liquor, recovering the sodium and sulphur constituents in the products of combustion from such smelting operation, smelting such recovered constituents together with said evaporated and concentrated spent liquor, introducing free sulphur during such smelting operation to make up losses of sulphur constituent in said process, recovering the smelted inorganic compounds in aqueous solution, adding caustic soda to the aqueous smelt solution to make up losses of sodium constituent in said process, and utilizing said smelt liquor in the liberation of fiber from other raw cellulosic material.

12. A cyclic process which comprises digesting raw cellulosic material in a liquor containing sodium sulphide, separating the pulp from the resulting spent liquor, re-employing one portion of such spent liquor for the digestion of other raw cellulosic material, evaporating and concentrating a portion of said other spent liquor, smelting the inorganic compounds contained in such concentrated and evaporated spent liquor, recovering the sodium and sulphur constituents in the products of combustion from such smelting operation, smelting such recovered constituents together with said evaporated and concentrated spent liquor, introducing free sulphur during said smelting operation to make up losses of sulphur constituent in said process, recovering the smelted inorganic compounds in aqueous solution, adding caustic soda to the smelt solution to make up losses of sodium constituent in said process, and utilizing said smelt liquor in the liberation of fiber from other raw cellulosic material together with said re-employed portion of spent liquor.

In testimony whereof I have affixed my signature.

GEORGE A. RICHTER.